(12) United States Patent
Yamasaki et al.

(10) Patent No.: US 12,723,150 B2
(45) Date of Patent: Sep. 1, 2026

(54) RESIN COMPOSITION AND POWER CABLE

(71) Applicant: SUMITOMO ELECTRIC INDUSTRIES, LTD., Osaka (JP)

(72) Inventors: Satoshi Yamasaki, Osaka (JP); Fumitoshi Iyoda, Osaka (JP); Takanori Yamazaki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 639 days.

(21) Appl. No.: 18/035,744

(22) PCT Filed: Oct. 26, 2021

(86) PCT No.: PCT/JP2021/039406
§ 371 (c)(1),
(2) Date: May 7, 2023

(87) PCT Pub. No.: WO2022/137780
PCT Pub. Date: Jun. 30, 2022

(65) Prior Publication Data

US 2023/0399500 A1 Dec. 14, 2023

(30) Foreign Application Priority Data

Dec. 21, 2020 (JP) ................................ 2020-211490

(51) Int. Cl.
*C08L 23/16* (2006.01)
*C08K 5/13* (2006.01)
*H01B 3/44* (2006.01)

(52) U.S. Cl.
CPC ................ *C08L 23/16* (2013.01); *C08K 5/13* (2013.01); *H01B 3/441* (2013.01); *C08L 2203/202* (2013.01); *C08L 2205/025* (2013.01)

(58) Field of Classification Search
CPC ...................................................... C08L 23/16
See application file for complete search history.

(56) References Cited

U.S. PATENT DOCUMENTS

2012/0292078 A1* 11/2012 Kibe ..................... H01B 7/295 524/193
2013/0264091 A1 10/2013 Watanabe
2016/0362566 A1 12/2016 Shimizu et al.

FOREIGN PATENT DOCUMENTS

AU 6971394 A * 1/1995 .......... C08K 5/1515
JP S57-069611 A 4/1982
(Continued)

OTHER PUBLICATIONS

Adeka, Polymer Additives, ADK STAB, Product List, Polymer Additives, ADK STAB, Adeka Corp., pp. 1-14, Nov. 24, 2021, with English explanation of relevance.

*Primary Examiner* — Sherman Ng
(74) *Attorney, Agent, or Firm* — Renner, Otto, Boisselle & Sklar, LLP

(57) ABSTRACT

A resin composition, including a resin component containing propylene units, and a resistance-imparting agent, wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 145° C. or less and a molecular weight of 200 or more and 500 or less, and a content of the resistance-imparting agent is 0.4 parts by mass or more and 10 parts by mass or less with respect to 100 parts by mass of the resin component.

8 Claims, 1 Drawing Sheet

(56) References Cited

FOREIGN PATENT DOCUMENTS

| | | | |
|---|---|---|---|
| JP | 2012-119196 | A | 6/2012 |
| JP | 2015-162929 | A | 9/2015 |
| JP | 2017-128677 | A | 7/2017 |
| WO | 2021/101753 | A1 | 5/2021 |

* cited by examiner

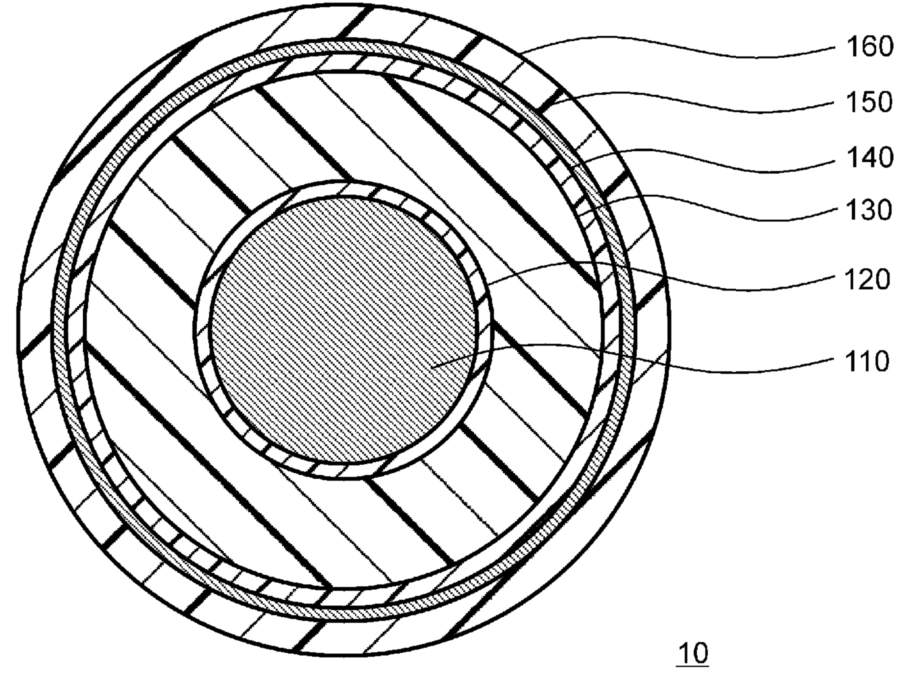
160
150
140
130
120
110
10

RESIN COMPOSITION AND POWER CABLE

TECHNICAL FIELD

The present application claims priority based on Japanese Laid-Open Patent Publication No. 2020-211490 filed on Dec. 21, 2020, the content of which is incorporated herein by reference in its entirety.

The present disclosure relates to a resin composition and a power cable.

BACKGROUND ART

Cross-linked polyethylene is excellent in an insulation, and therefore has been widely used as a resin component included in an insulating layer in a power cable and the like (e.g., PTL. 1).

However, cross-linked polyethylene which has been degraded over time cannot be recycled and has no choice but to be incinerated. For this reason, there is concern about the influence on environment.

CITATION LIST

Patent Literature

[PTL. 1] Japanese Laid-Open Patent Publication No. S57-69611

SUMMARY OF INVENTION

Solution to Problem

According to an aspect of the present disclosure, there is provided a resin composition, including:

- a resin component containing propylene units, and
- a resistance-imparting agent,
- wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 145° C. or less and a molecular weight of 200 or more and 500 or less, and
- a content of the resistance-imparting agent is 0.4 parts by mass or more and 10 parts by mass or less with respect to 100 parts by mass of the resin component.

According to another aspect of the present disclosure, there is provided a power cable, including:

- a conductor, and
- an insulating layer coated on an outer circumference of the conductor,
- wherein the insulating layer is formed from a resin composition,
- the resin composition includes a resin component containing propylene units, and a resistance-imparting agent,
- the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 145° C. or less and a molecular weight of 200 or more and 500 or less, and
- a content of the resistance-imparting agent is 0.4 parts by mass or more and 10 parts by mass or less with respect to 100 parts by mass of the resin component.

BRIEF DESCRIPTION OF DRAWINGS

FIG. 1 is a schematic cross-sectional view orthogonal to an axial direction of a power cable according to an embodiment of the present disclosure.

DESCRIPTION OF EMBODIMENTS

Problem to be Solved by Disclosure

In recent years, as resin components included in the insulating layer, propylene-containing resins (hereinafter also referred to as "propylene-based resins") have attracted attention as the resin components included in the insulating layer. The propylene-based resins, even non-cross-linked ones, can achieve a high insulation. In other words, both the insulation and recyclability can be achieved. In addition, use of the propylene-based resin can improve handling, processability, and ease of manufacture.

However, the use of the propylene-based resin as the resin component included in the insulating layer may fail to provide an insulation inherent in the propylene-based resin in some cases. In addition, according to the study by the present inventors, it is found that in the insulating layer including the propylene-based resin, the insulation is significantly reduced, for example, when the power cable is bent and a stress due to the bending is applied to the insulating layer.

An object of the present disclosure is to provide a technique that can improve an insulation and reduce degradation of the insulation due to an external stress, in an insulating layer including a propylene-based resin.

Advantageous Effect of Disclosure

According to the present disclosure, an insulation can be improved and degradation of the insulation due to an external stress can be reduced in a resin composition including a propylene-based resin.

Description of Embodiment of Disclosure

Knowledges Obtained by the Inventors

First, an outline of the knowledges obtained by the inventors will be described.

In general, the propylene-based resin has a large amount of crystals and tends to form coarse crystals. Therefore, when the insulating layer is formed only from the propylene-based resin, the insulating layer tends to be hard. For this reason, when the propylene-based resin is used as the resin component included in the insulating layer, it is necessary to control the crystallinity of the propylene-based resin by mixing a low-crystallinity resin or the like therein.

However, when the low-crystallinity resin or the like is mixed in the propylene-based resin to form the insulating layer, very fine voids may be formed in the insulating layer and the inherent insulation cannot be obtained in some cases. Even when there are no apparent voids and no problems in terms of properties in the insulating layer, the insulation may be significantly degraded, for example, after a large external stress due to bending is applied. The present inventors have investigated this problem and have found that voids are newly formed due to an external stress.

As described above, in the insulating layer including the propylene-based resin, a high insulation cannot be obtained due to fine voids or an insulation may be significantly degraded by voids being generated due to the bending.

The present inventors have studied the above-described problems. As a result, the present inventors have found that an addition of a certain additive can reduce degradation of insulation due to fine voids and voids generated due to the bending. Such an additive is a monomer that is used as an antioxidant, has a phenol skeleton with hydrogen or an alkyl group having 1 to 3 carbon atoms, bonded to at least one of ortho positions to the hydroxyl group of the phenol skeleton, and has a molecular weight of 200 or more and 500 or less and a melting point lower than that of the propylene-based resin.

According to the investigation of the present inventors, since the above-described monomer that has been commonly used as an antioxidant has a predetermined chemical structure, molecular weight, and melting point, it can fill fine voids or voids formed due to the bending, in the insulating layer. Filling the voids acts to mitigate a sharp change in resistance between the insulating layer and the voids, thereby reducing degradation of the insulation due to the voids. That is, the above-described monomer acts not only as an antioxidant, but as a resistance-imparting agent that imparts resistance to the insulating layer against degradation of the insulation due to the voids.

Further, it is found that insulation can be improved and degradation of the insulation due to the bending can be reduced by blending a predetermined amount of the above-described compound into the resin composition including the propylene-based resin, thereby filling a resistance-imparting agent in the fine voids present in the insulating layer or the voids formed upon application of an external stress.

The present disclosure is based on the above-described knowledges found by the inventors.

Embodiments of Disclosure

Next, embodiments of the present disclosure will be listed and described.

[1] A resin composition according to an aspect of the present disclosure includes:

a resin component containing propylene units, and a resistance-imparting agent, wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 145° C. or less and a molecular weight of 200 or more and 500 or less, and a content of the resistance-imparting agent is 0.4 parts by mass or more and 10 parts by mass or less with respect to 100 parts by mass of the resin component.

According to this configuration, an insulation can be improved and degradation of the insulation due to an external stress can be reduced, in the resin composition including the propylene-based resin.

[2] A power cable according to another aspect of the present disclosure includes:

a conductor, and an insulating layer coated on an outer circumference of the conductor, wherein the insulating layer is formed from a resin composition, the resin composition includes a resin component containing propylene units, and a resistance-imparting agent, the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 145° C. or less and a molecular weight of 200 or more and 500 or less, and a content of the resistance-imparting agent is 0.4 parts by mass or more and 10 parts by mass or less with respect to 100 parts by mass of the resin component.

According to this configuration, an insulation can be improved and degradation of the insulation due to an external stress can be reduced, in the insulating layer containing the propylene-based resin.

[3] In the power cable according to [2], the resin component includes at least one of ethylene units and styrene units.

According to this configuration, excessive crystal growth of the propylene-based resin can be reduced, and formation of voids in the insulating layer can be reduced.

[4] In the power cable according to [2] or [3], the resistance-imparting agent has a linear carbon structure having 5 or more and 10 or less carbon atoms.

According to this configuration, electrical stability can be imparted to the insulating layer.

[5] In the power cable according to any one of [2] to [4], the resistance-imparting agent contains a sulfur atom.

According to this configuration, electrical stability can be imparted to the insulating layer.

[6] In the power cable according to any one of [2] to [5], the resistance-imparting agent has a melting point such that it becomes liquid at 27° C.

According to this configuration, the resistance-imparting agent can be easily retained at locations from which cracks and voids originate in the insulating layer, and the resistance-imparting agent can be reliably filled in newly formed voids and the like.

[7] In the power cable according to any one of [2] to [6], the resistance-imparting agent is a phenolic antioxidant.

According to this configuration, an effect of the antioxidant can be imparted to the insulating layer.

[8] In the power cable according to any one of [2] to [7], the resin composition includes as the propylene-based resin a propylene homopolymer having a melting point of 160° C. or more and 175° C. or less and an enthalpy of fusion of 100 J/g or more and 120 J/g or less, and the resin composition has a melting point of 158° C. or more and 168° C. or less and an enthalpy of fusion of 55 J/g or more and 110 J/g or less.

According to this configuration, excessive crystal growth of the propylene-based resin can be reduced in the insulating layer, and a higher insulation can be obtained in the insulating layer.

[9] In the power cable according to any one of [2] to [7], the resin composition includes as the propylene-based resin a propylene random copolymer having a melting point of 140° C. or more and 155° C. or less and an enthalpy of fusion of 90 J/g or more and 105 J/g or less, and the resin composition has a melting point of 140° C. or more and 150° C. or less and an enthalpy of fusion of 55 J/g or more and 100 J/g or less.

According to this configuration, excessive crystal growth of the propylene-based resin can be reduced in the insulating layer, and a higher insulation can be obtained in the insulating layer.

DETAILS OF EMBODIMENT OF DISCLOSURE

Next, an embodiment of the present disclosure will be described below with reference to the drawings. The present disclosure is not limited to these illustrations, but intended to be indicated by claims and encompass all the changes which fall within the meaning and scope equivalent to claims.

One Embodiment of Disclosure (1) Resin Composition

The resin composition of this embodiment is a material included in an insulating layer 130 of a power cable 10 described later, and includes, for example, a resin component containing propylene units, a resistance-imparting agent, and other additives as needed.

The resin composition of this embodiment includes at least the propylene-based resin as a resin component, and when the resin composition is analyzed using a Nuclear Magnetic Resonance (NMR) system, at least the propylene units are detected. For example, when the propylene-based resin is random polypropylene, propylene units and ethylene units are detected, and when the propylene-based resin is a propylene homopolymer, propylene units are detected.

The resin component preferably contains at least one of the low-crystallinity resin and the styrene-based resin as a flexible component that reduces crystallinity of the propylene-based resin to enhance the flexibility of the insulating layer. When the resin component contains the low-crystallinity resin and the styrene-based resin, the monomer units derived from these resins are detected by NMR analysis of the resin composition. For example, when an ethylene-propylene rubber (EPR) described below is contained as the low-crystallinity resin, propylene units and ethylene units derived from the EPR are detected. For example, when a styrene-based resin is contained, styrene units derived from the styrene-based resin are detected.

Next, individual components will be explained.

(Propylene-Based Resin)

The propylene-based resin is a base polymer of the resin composition, and is a component whose content is the highest in the resin component. As the propylene-based resin, for example, a propylene homopolymer (hereinafter also referred to as homo PP) or a propylene random copolymer (hereinafter also referred to as random PP) may be used. As the propylene-based resin, the random PP is preferably used. Comparing the homo PP and the random PP, the random PP tends to have a smaller amount of crystals because of containing the ethylene units, but it can reduce formation of cracks and voids associated with coarsened crystals, in the insulating layer. Therefore, the random PP can provide a higher insulation compared to the homo PP. In addition, the homo PP can reduce formation of voids when an external stress such as bending is applied to the insulating layer, and further reduce variation in the insulation before and after the bending.

Moreover, tacticity of the propylene-based resin is not particularly limited, but is preferably isotactic. Since an isotactic propylene-based resin can reduce crystallinity when mixed with the low-crystallinity resin compared to a syndiotactic or atactic one, thereby improving brittleness of the insulating layer at low temperature, and enhancing the insulation.

The melting point and the enthalpy of fusion of the propylene-based resin are not particularly limited. For example, for the homo PP, the melting point is preferably 160° C. or more and 175° C. or less, and the enthalpy of fusion is preferably 100 J/g or more and 120 J/g or less. For example, for the random PP, the melting point is preferably 140° C. or more and 155° C. or less, and the enthalpy of fusion is preferably 90 J/g or more and 105 J/g or less.

(Low-Crystallinity Resin)

The low-crystallinity resin is a component that controls crystal growth (amount of crystals) of the propylene-based resin to impart flexibility to the insulating layer. Here, the low-crystalline resin means a component that is low crystalline or amorphous, and has no melting point or, if any, a melting point of 100° C. or less. The enthalpy of fusion of the low-crystallinity resin is, for example, 50 J/g or less, and preferably, 30 J/g or less.

The low-crystallinity resin is preferably a copolymer obtained by copolymerization of at least any two of ethylene, propylene, butene, hexene, and octene, from a viewpoint of enhancing controllability of the crystal growth and flexibility of the insulating layer. A carbon-carbon double bond in a monomer unit included in the low-crystallinity resin is preferably at an α-position, for example.

Examples of the low-crystallinity resin include ethylene-propylene rubber (EPR) and very low density polyethylene (VLDPE). The very low density polyethylene is a polyethylene having a density of 0.91 g/cm 3 or less, preferably from 0.855 g/cm 3 to 0.890 g/$cm^3$.

The low-crystallinity resin is preferably a copolymer containing propylene, for example, from a viewpoint of compatibility with the propylene-based resin. As an exemplary copolymer containing propylene, EPR is mentioned among those described above.

An ethylene content in EPR is, for example, 20 mass % or more, preferably 40 mass % or more, and more preferably 55 mass % or more. When the ethylene content is less than 20 mass %, the compatibility of EPR with the propylene-based resin becomes excessively high. Therefore, even when the content of EPR in the insulating layer is reduced, the insulating layer can be made more flexible. However, the crystallization of the propylene-based resin cannot be sufficiently controlled, and the insulation may be degraded. In contrast, by setting the ethylene content to 20 mass % or more, the compatibility of EPR with the propylene-based resin can be prevented from becoming excessively high. Accordingly, the crystallization of the propylene-based resin by EPR can be sufficiently controlled while obtaining flexibilizing effect by EPR. As a result, the degradation of the insulation can be reduced. Further, by setting the ethylene content preferably to 40 mass % or more, and more preferably to 55 mass % or more, the crystallization can be more stably controlled, thereby to stably reduce degradation of the insulation. Note that the ethylene content refers to a mass ratio of the ethylene units to the ethylene units and the propylene units included in EPR.

On the other hand, the low-crystallinity resin may be, for example, a propylene-free copolymer. As the propylene-free copolymer, for example, VLDPE is preferred from a viewpoint of easy availability. Examples of VLDPE include PE including ethylene and 1-butene, and PE including ethylene and 1-octene.

The propylene-free copolymer as the low-crystallinity resin can reduce complete compatibility while a predetermined amount of the low-crystalline resin is mixed in the propylene-based resin. Therefore, by setting the content of the copolymer to a predetermined amount or more, the crystallization of the propylene-based resin can be stably controlled.

(Styrene-Based Resin)

The styrene-based resin is a styrene-based thermoplastic elastomer containing styrene as a hard segment, and at least one of ethylene, propylene, butylene, isoprene, and the like as a soft segment. The styrene-based resin, similar to the low-crystallinity resin, can be dispersed in the resin composition to control the crystal growth of the propylene-based resin. In particular, when the styrene-based resin, together with the low-crystalline resin, is mixed in the propylene-based resin, the styrene-based resin is considered to be finely dispersed in the propylene-based resin, originating from the low-crystallinity resin, thereby forming a specific phase structure. Such a phase structure can reduce the excessive crystal growth of the propylene-based resin. In addition, since the styrene-based resin can trap electrons with aromatic rings to form a stable resonance structure, it can further improve the insulation of the insulating layer. Note that the styrene-based resin neither has a melting point nor an enthalpy of fusion.

Examples of the styrene-based resin include styrene-butadiene-styrene block copolymers (SBS), hydrogenated styrene-butadiene-styrene block copolymers, styrene-isoprene-styrene copolymers (SIS), hydrogenated styrene-isoprene-styrene copolymers, hydrogenated styrene-butadiene rubbers, hydrogenated styrene-isoprene rubbers, and styrene-ethylene-butylene-olefin crystal block copolymers. Two or more of them may be used in combination.

The term "hydrogenated" as used herein means hydrogen being added to a double bond. For example, "hydrogenated styrene-butadiene-styrene block copolymer" means a polymer obtained by adding hydrogen to double bonds of the styrene-butadiene-styrene block copolymer. Note that double bonds in the aromatic ring included in styrene has no hydrogen added thereto. The term "hydrogenated styrene-butadiene-styrene block copolymer" can also be referred to as styrene-ethylene butylene-styrene block copolymer (SEBS).

As the styrene-based resin, those having no double bonds in their chemical structures excluding benzene rings are preferred. The use of those having double bonds may result in thermally degraded resin component, for example, during molding of the resin composition, which may degrade the properties of the resulting molded body. In this regard, since those having no double bond has high resistance to thermal degradation, they can be used to maintain the properties of the molded body at a higher level.

The styrene content of the styrene-based resin is not particularly limited, but preferably 5 mass % or more and 35 mass % or less from viewpoints of controlling the crystal growth of the propylene-based resin and flexibilizing the molded body. Note that the styrene content indicates a mass ratio of the styrene units to the component units included in the styrene-based resin.

(Resistance-Imparting Agent)

The resistance-imparting agent is a component that fills voids present in the insulating layer to reduce degradation of the insulation due to the voids. In addition, the resistance-imparting agent serves as an antioxidant, and can reduce degradation of the resin composition at the time of heat-mixing. Specifically, the resistance-imparting agent is a monomer that has a phenol skeleton, including hydrogen or an alkyl group having 1 to 3 carbon atoms, bonded to at least one of ortho positions to the hydroxyl group of the phenol skeleton, and has a melting point lower than that of the resin component and a molecular weight of 200 or more and 500 or less. Preferably, the resistance-imparting agent is a phenolic antioxidant having the above-described chemical structure, melting point, and molecular weight.

The mechanism by which the resistance-imparting agent fills the voids and reduces the degradation of the insulation due to the voids is presumed as follows.

Since the resistance-imparting agent tends to have a melting point of 145° C. or less which is lower than that of the resin component, it melts to become liquid when heat-mixed with the resin component. When the resin composition obtained by the heat-mixing is molded into the insulating layer and cooled, the resin component first begins to solidify. In this event, the crystal growth of the propylene-based resin progresses, which may lead to generation of fine voids. Since the resistance-imparting agent has a melting point lower than that of the resin component and exists in a liquid state at the stage when the resin component begins to solidify, it can move into the voids to fill them.

Moreover, since the resistance-imparting agent has the molecular weight of 200 or more, volatilization of the resistance-imparting agent when heat-mixed with the resin composition can be reduced, and the resistance-imparting agent can be stably filled in the voids. Furthermore, since the molecular weight is 500 or less, the resistance-imparting agent can be suitably moved in the resin component, and aggregation of the resistance-imparting agent can be reduced. As a result, the resistance-imparting agent can be uniformly dispersed in the resin composition, and the resistance-imparting agent can be stably filled in the voids.

In addition, since the resistance-imparting agent has aromatic rings derived from its phenol skeleton, it can fill the voids and impart electrical stability to the insulating layer. Further, the resistance-imparting agent has a polarity due to its phenol skeleton. Therefore, when filled in the voids, it can mitigate a sharp change in resistance between the resistance-imparting agent and the insulating layer, and maintain the insulation.

Moreover, the resistance-imparting agent has hydrogen or an alkyl group having 1 to 3 carbon atoms at at least one of the ortho positions to the hydroxyl group included in its phenol skeleton, and no bulky substituent located at at least either of the ortho positions to the hydroxyl group. Therefore, the resistance-imparting agent has small steric hindrance around the hydroxyl group. In contrast, for a monomer having bulky substituents (e.g., t-butyl groups) located at both ortho positions to the hydroxyl group, for example, for a hindered phenolic antioxidant, steric hindrance around the hydroxyl group is greater. Such a monomer, in which the reactivity of the hydroxyl groups may be inhibited by steric hindrance, may fail to exhibit the inherent properties in some cases. In this regard, the resistance-imparting agent of this embodiment has small steric hindrance and the hydroxyl group with high reactivity, and thus can stably exhibit the property of maintaining the insulation.

As described above, the resistance-imparting agent can fill the voids in the insulating layer, and also impart electrical stability to the insulating layer. Therefore, even when fine voids are present in the insulating layer or voids are formed due to the bending of the insulating layer, degradation of the insulation due to the voids can be mitigated and the insulation can be maintained at high level.

A molecular weight of the resistance-imparting agent is 200 or more and 500 or less. From the viewpoints of reducing volatilization of the resistance-imparting agent and reducing aggregation of the resistance-imparting agent to disperse in the resin composition, the molecular weight of the resistance-imparting agent is preferably 300 or more and 450 or less.

The melting point of the resistance-imparting agent may be 145° C. or less, and is preferably 130° C. or less. Since the melting point is 130° C. or less, the resistance-imparting agent can be more reliably filled in the voids generated in the insulating layer. Further, the melting point may be such that the resistance-imparting agent becomes liquid at an ordinary temperature (27° C.). Specifically, it is more preferably 27° C. or less. The resistance-imparting agent that becomes liquid at 27° C. tends to easily collect at locations with sparse molecular chains from which cracks and voids originate in the insulating layer. Therefore, an external stress is applied to the insulating layer, and the resistance-imparting agent can be reliably filled in newly formed voids. The lower limit is not particularly limited, but is preferably −30° C. or more.

For the resistance-imparting agent, the number of the phenol skeletons is not particularly limited so long as the molecular weight of the resistance-imparting agent falls within a range of 200 or more and 500 or less, and is 1 or 2, for example.

From the viewpoint of enhancing compatibility with the resin component, the resistance-imparting agent preferably has a linear carbon structure having 5 or more and 10 or less carbon atoms in the phenol skeleton. By enhancing compatibility of the resistance-imparting agent, the resistance-imparting agent can be stably present at location where voids are easily generated, and can be reliably filled in the voids when the voids are generated. The number of the linear carbon structures is not particularly limited so long as the molecular weight of the resistance-imparting agent falls within the above-described range, but is 1 or 2, for example. From the viewpoint of enhancing the compatibility while satisfying the molecular weight range, the number of the linear carbon structures is preferably 2. Further, the linear carbon structure may be at the other ortho position to the hydroxyl group. It is because hydrogen or an alkyl group having 1 to 3 carbon atoms present at at least one of the ortho positions to the hydroxyl group can reduce degradation of reactivity due to steric hindrance. Furthermore, the linear carbon structure may be bonded to the aromatic ring, directly or through another atom such as a sulfur atom or a nitrogen atom.

The resistance-imparting agent is a monomer containing carbon, hydrogen, and oxygen atoms. In addition to the atoms described above, it may contain sulfur or nitrogen atoms. Preferably, it contains a sulfur atom.

There is no limitation on the resistance-imparting agent so long as it satisfies the chemical structure, molecular weight, and melting point described above. For example, 2-(2H-benzotriazol-2-yl)-4-(1,1,3,3-tetramethylbutyl)phenol, 2-hydroxy-4-n-octyloxybenzophenone, 2,4-dihydroxybenzophenone, 2,2'-dihydroxy-4,4'-dimethoxybenzophenone, 2,4-bis(octylthiomethyl)-6-methylphenol, nonylphenol, or dinonylphenol can be used. Among them, 2,4-bis(octylthiomethyl)-6-methylphenol is preferred because it has a linear carbon structure having a sulfur atom and 5 or more and 10 or less carbon atoms, and has high compatibility with the resin component.

The content of the resistance-imparting agent is 0.4 parts by mass or more and 10 parts by mass or less with respect to 100 parts by mass of the resin component. Preferably, it is 0.5 parts by mass or more and 8 parts by mass or less. Since the resistance-imparting agent can be easily filled in the voids by setting its content to 0.4 parts by mass or more, degradation of the insulation due to the voids can be mitigated. Further, excessively greater addition amount of the resistance-imparting agent makes it difficult to mold the resin composition into the insulating layer. However, setting the addition amount to 10 parts by mass or less can secure moldability of the resin composition.

(Other Additives)

The resin composition may include other additives as needed. As the other additives, antioxidants excluding the resistance-imparting agents described above, copper inhibitors, lubricants, and colorants may be included.

However, in the resin composition, for example, the content of the additive that serves as a nucleating agent for generating propylene crystals is preferably small. More preferably, the resin composition is substantially free from such an additive. Specifically, the content of the additive that serves as a nucleating agent is, for example, preferably less than 1 part by mass, and more preferably 0 parts by mass, with respect to a total content of the resin components being 100 parts by mass. Accordingly, the occurrence of unexpected abnormal crystallization due to the nucleating agent can be reduced, and the amount of crystals can be easily controlled.

In addition, from the viewpoint of recycling, the resin composition is preferably non-cross-linked, without cross-linking, but may include the cross-linking agent for cross-linking. When cross-linked, it is preferable to perform cross-linking so as to reduce the gel fraction (degree of cross-linking). Specifically, it is preferable to perform cross-linking with the degree of cross-linking such that the mass ratio of the residue of the cross-linking agent in the resin composition is less than 300 ppm. When dicumyl peroxide is used as the cross-linking agent, the residue includes, for example, cumyl alcohol and α-methylstyrene.

(Melting Point and Enthalpy of Fusion of Resin Composition)

The melting point and the enthalpy of fusion of the resin composition vary depending on the individual content of the propylene-based resin or the low-crystallinity resin used as the resin component, and are considered as indicators of the resin composition. The melting point and the enthalpy of fusion of the resin composition are not particularly limited, but it is preferred that when the random PP is included as the propylene-based resin, the melting point is 140° C. or more and 150° C. or less, and the enthalpy of fusion is 55 J/g or more and 100 J/g or less. More preferably, the melting point is 140° C. or more and 148° C. or less, and the enthalpy of fusion is 55 J/g or more and 95 J/g or less. On the other hand, it is preferred that when the homo PP is included as the propylene-based resin, the melting point is 158° C. or more and 168° C. or less, and the enthalpy of fusion is 55 J/g or more and 110 J/g or less. More preferably, the melting point is 158° C. or more and 165° C. or less, and the enthalpy of fusion is 55 J/g or more and 100 J/g or less. By blending the propylene-based resin and at least one of the low-crystallinity resin and the styrene-based resin so as to have the melting point and enthalpy of fusion described above, excessive crystal growth of the propylene-based resin can be reduced, and the properties due to the resins can be obtained.

The "melting point" and "enthalpy of fusion" used herein are measured by differential scanning calorimetry (DSC). The "differential scanning calorimetry" is performed, for example, according to JIS-K-7121 (1987). Specifically, in the DSC apparatus, the temperature of a measurement sample is raised from room temperature (ordinary temperature, for example, 27° C.) to 220° C. at a rate of 10° C./min. Accordingly, by plotting endothermic amount per unit time (heat flow) against temperature, a DSC curve can be obtained.

In this case, the temperature at which an endothermic amount per unit time in the sample is maximum (highest peak) is defined as "melting point (melting peak temperature)". In this case, assuming that all the endotherm of the sample is performed by the resin component, the value (J/g)

obtained by dividing the endothermic amount (J) of the sample from room temperature to 220° C. by the total mass (g) of the resin component in the sample is defined as "enthalpy of fusion". The crystallinity (%) of the sample can be obtained based on the enthalpy of fusion of the sample and the theoretical enthalpy of fusion of the perfect crystal.

(Resin Composition)

It is preferred that the content of each component included in the resin composition is adequately modified so that the melting point and the enthalpy of fusion of the resin composition fall within the above-described range. For example, the resin composition preferably includes 55 parts by mass or more and 95 parts by mass or less of the propylene-based resin and 5 parts by mass or more and 45 parts by mass or less of the flexible component, with respect to a total of the propylene-based resin and the flexible component containing at least one of the low-crystallinity resin and the styrene-based resin being 100 parts by mass. More preferably, it includes 60 parts by mass or more and 95 parts by mass or less of the propylene-based resin, and 5 parts by mass or more and 40 parts by mass or less of the flexible component. With such addition amounts, the amount of crystals can be adjusted within an appropriate range in the resin composition. As a result, when the insulating layer is formed using the resin composition, formation of the voids in the insulating layer can be reduced. The addition ratio of the low-crystallinity resin and the styrene-based resin is not particularly limited so long as the addition amount totaling them falls within the above-described range.

(2) Power Cable

Next, with reference to FIG. 1, the power cable of this embodiment will be described. FIG. 1 is a cross-sectional view orthogonal to an axial direction of the power cable according to this embodiment.

The power cable 10 of this embodiment is configured as a so-called solid insulation power cable. In addition, the power cable 10 of this embodiment is configured, for example, to be laid on the ground (in a pipeline), under water, or on the bottom of water. The power cable 10 is used, for example, for AC.

Specifically, the power cable 10 includes, for example, a conductor 110, an internal semiconductive layer 120, an insulating layer 130, an external semiconductive layer 140, a shielding layer 150, and a sheath 160.

(Conductor (Conductive Part))

The conductor 110 is configured by twisting together a plurality of conductor core wires (conductive core wires) including, for example, pure copper, copper alloy, aluminum, aluminum alloy, or the like.

(Internal Semiconductive Layer)

The internal semiconductive layer 120 is provided so as to cover the outer circumference of the conductor 110. In addition, the internal semiconductive layer 120 has semiconductivity, and is configured to reduce concentration of electric field on the surface side of the conductor 110. The internal semiconductive layer 120 includes, for example, at least any one of ethylene-based copolymers such as ethylene-ethyl acrylate copolymers, ethylene-methyl acrylate copolymers, ethylene-butyl acrylate copolymers, and ethylene-vinyl acetate copolymers, olefinic elastomers, the above-described low-crystallinity resins and the like, together with conductive carbon black.

(Insulating Layer)

The insulating layer 130 is provided so as to cover the outer circumference of the internal semiconductive layer 120, and configured as the above-described resin composition molded body. The insulating layer 130 is extruded, for example, from the resin composition, as described above.

(External Semiconductive Layer)

The external semiconductive layer 140 is provided to cover the outer circumference of the insulating layer 130. In addition, the external semiconductive layer 140 has semiconductivity, and is configured to reduce concentration of electric field between the insulating layer 130 and the shielding layer 150. The external semiconductive layer 140 includes, for example, the same material as that of the internal semiconductive layer 120.

(Shielding Layer)

The shielding layer 150 is provided so as to cover the outer circumference of the external semiconductive layer 140. The shielding layer 150 is, for example, configured by winding a copper tape, or configured as a wire shield formed by winding a plurality of soft copper wires. A tape including rubberized cloth or the like as a raw material may be wound inside or outside the shielding layer 150.

(Sheath)

The sheath 160 is provided so as to cover the outer circumference of the shielding layer 150. The sheath 160 includes, for example, polyvinyl chloride or polyethylene.

For an underwater cable or a subaqueous cable, the power cable 10 of this embodiment may have a metallic water shielding layer such as a so-called alclad or an iron wire armoring outside the shielding layer 150.

On the other hand, the power cable 10 of this embodiment does not have to include a water shielding layer outside the shielding layer 150. That is, the power cable 10 of this embodiment may include an imperfect water shielding structure.

(Specific Dimensions and the Like)

Specific dimensions of the power cable 10 are not particularly limited. For example, the diameter of the conductor 110 is 5 mm or more and 60 mm or less, the thickness of the internal semiconductive layer 120 is 0.5 mm or more and 3 mm or less, the thickness of the insulating layer 130 is 3 mm or more and 35 mm or less, the thickness of the external semiconductive layer 140 is 0.5 mm or more and 3 mm or less, the thickness of the shielding layer 150 is 0.1 mm or more and 5 mm or less, and the thickness of the sheath 160 is 1 mm or more. The AC voltage applied to the power cable 10 of this embodiment is, for example, 20 kV or more.

(3) Cable Properties

In this embodiment, since the insulating layer 130 (resin composition molded body) is configured to include the above-described resistance-imparting agent, the insulation described below can be obtained.

The insulating layer 130 of this embodiment can retain a high insulation even when an external stress is applied due to the bending. Specifically, 0.4 mm-thick sheet formed from the resin composition described above is subjected to 180° bending test described below, and a sheet under an external stress at an ordinary temperature is subjected to a commercial frequency (e.g., 60 Hz) AC voltage under conditions of applying a voltage of 10 kV for 10 minutes, then repeating cycle of raising the voltage by 1 kV increment and applying the raised voltage for 10 minutes. In this event, the AC breakdown electric field strength is 45 kV/mm or more even when no voids are observed, and 70 kV/mm or more when voids are observed.

Further, the insulating layer 130 can maintain a high AC breakdown electric field strength even when voids are formed due to an external stress such as bending. That is, there is a small difference in the AC breakdown electric field strength of the insulating layer 130 between a state before application of an external stress such as bending and a state after application of an external stress such as bending. Specifically, a ratio of variation in the AC breakdown electric field strength due to the bending is 30% or less. Here, the ratio of variation in the AC breakdown electric field strength is a ratio representing a difference in the AC breakdown electric field strength before and after the bending relative to an AC breakdown electric field strength in a normal state before the bending.

(4) Method of Producing Power Cable

Next, a method of producing the power cable of this embodiment will be described. Hereinafter, the step is abbreviated as "S".

(S100: Resin Composition Preparation Step)

First, the resin composition for forming the insulating layer 130 is prepared.

In this embodiment, as the resin components, a propylene-based resin, a flexible component containing at least one of a low-crystallinity resin and a styrene-based resin, a resistance-imparting agent, and other additives as needed are mixed (kneaded) in a mixer to form an admixture. Examples of the mixer include an open roll, a Banbury mixer, a pressure kneader, a single-screw mixer, and a multi-screw mixer.

In this case, as for the addition amount of individual resins, for example, that for the propylene-based resin may be 55 parts by mass or more and 95 parts by mass or less, and that for the flexible component may be 5 parts by mass or more and 45 parts by mass or less, with respect to a total content of the propylene-based resin and the flexible component containing at least one of a low-crystallinity resin and a styrene-based resin being 100 parts by mass. The content of the resistance-imparting agent is 0.4 parts by mass or more and 10 parts by mass or less, with respect to a total content of the propylene-based resin and the low-crystallinity resin being 100 parts by mass.

After the admixture is formed, the admixture is granulated by an extruder. As a result, a pellet-like resin composition that is to be included in the insulating layer 130 is formed. The steps from the mixing step through the granulation step may be collectively performed using a twin-screw type extruder with high kneading performance.

(S200: Conductor Preparation Step)

On the other hand, a conductor 110 is prepared which is formed by twisting a plurality of conductor core wires.

(S300: Cable Core Formation Step (Extrusion Step, Insulating Layer Formation Step))

After the resin composition preparation step S100 and the conductor preparation step S200 are completed, the above-described resin composition is used to form the insulating layer 130 with a thickness of 3 mm or more which covers the outer circumference of the conductor 110.

In this event, the internal semiconductive layer 120, the insulating layer 130, and the external semiconductive layer 140 are formed simultaneously, for example, using a three-layer coextruder.

Specifically, for example, a resin composition for the internal semiconductive layer is charged into an extruder A of the three-layer coextruder, the extruder A forming the internal semiconductive layer 120.

The pellet-like resin composition described above is charged into an extruder B forming the insulating layer 130. The set temperature of the extruder B is set to a temperature higher than the desired melting point by 10° C. or more and 50° C. or less. It is preferable to appropriately adjust the set temperature based on a linear velocity and an extrusion pressure.

A composition for the external semiconductive layer is charged into an extruder C forming the external semiconductive layer 140, the composition including materials similar to those of the resin composition for the internal semiconductive layer charged into the extruder A.

Then, the respective extrudates from the extruders A to C are guided to a common head, and the internal semiconductive layer 120, the insulating layer 130, and the external semiconductive layer 140, outwardly from the inside, are simultaneously extruded on the outer circumference of the conductor 110. Accordingly, an extruded material that is to be a cable core is formed.

The extruded material is then cooled, for example, with water.

During such cooling, the resin component including the propylene-based resin first begins to solidify in the resin composition included in the insulating layer 130. In this event, since the resistance-imparting agent having a melting point lower than that of the resin component is present in a molten liquid state, it will move to and fill the fine voids formed upon solidification.

The cable core including the conductor 110, the internal semiconductive layer 120, the insulating layer 130, and the external semiconductive layer 140 is formed by the cable core formation step S300 described above.

(S400: Shielding Layer Formation Step)

After the cable core is formed, the shielding layer 150 is formed outside the external semiconductive layer 140, for example, by winding a copper tape therearound.

(S500: Sheath Formation Step)

After the shielding layer 150 is formed, vinyl chloride is charged into an extruder, and extruded from the extruder to form a sheath 160 on the outer circumference of the shielding layer 150.

As described above, the power cable 10 as the solid insulation power cable is produced.

(4) Effect According to this Embodiment

According to this embodiment, one or more effects described below are achieved.

(a) The insulating layer of this embodiment is formed from the resin composition that includes the resin component containing the propylene-based resin and at least one of the low-crystallinity resin and the styrene-based resin, and the resistance-imparting agent having a predetermined molecular weight, melting point, and chemical structure so that the content of the resistance-imparting agent is 0.4 parts by mass to 10 parts by mass with respect to 100 parts by mass of the resin component. The low-crystallinity resin and the styrene-based resin can reduce excessive crystal growth of the propylene-based resin. The resistance-imparting agent enters the voids, for example, unobservable fine voids present in the resin composition, so as to reduce a sharp change in resistance generated between the resin component and the voids. Accordingly, a high insulation can be obtained in the insulating layer. Although voids may be formed due to the bending of the insulating layer, the degradation of the insulation due to the voids can be reduced by filling the voids with the resistance-imparting agent. As described above, the insulating layer of this embodiment can improve the insulation in a state before application of an external stress, and also maintain the difference in the AC breakdown electric field strength before and after application of the external stress due to the bending small, thereby reducing variation in the insulation before and after the bending.

(b) The melting point of the resistance-imparting agent is preferably 130° C. or less, and more preferably a melting point such that the resistance-imparting agent becomes liquid at 27° C. The resistance-imparting agent having such a melting point can more reliably fill the voids formed from the propylene-based resin, and further reduce the variation in the insulation in the insulating layer before and after the bending.

(c) The resistance-imparting agent preferably has a linear carbon structure having 5 or more and 10 or less carbon atoms. The resistance-imparting agent preferably contains a sulfur atom. Such a resistance-imparting agent is excellent in compatibility with the resin component, and therefore can more stably fill the voids in the insulating layer and also impart electrical stability to the insulating layer. As a result, the insulation in the initial state in the insulating layer can be improved, and the variation in the insulation before and after the bending can be further reduced.

(d) Since the homo PP has a large amount of crystals, inter- and intra-crystalline cracks and voids are likely to occur in the insulating layer when the homo PP is used as the propylene-based resin. Therefore, the insulation of the insulating layer not only inherently tends to be reduced, but also likely to be reduced when the insulating layer is bent. In this regard, the resistance-imparting agent can fill not only the voids initially present in the insulating layer but also the voids formed by the bending. Accordingly, the insulation of the insulating layer can be improved, degradation of the insulation due to the bending can be reduced, and the high insulation can be maintained.

On the other hand, for the random PP that has a smaller amount of crystals than the homo PP, cracks and voids are less likely to occur in the insulating layer, and new voids are less likely to be formed when the insulating layer is bent. However, even in the random PP, there is a tendency that the insulation inherent in the random PP cannot be obtained because of the presence of unobservable fine voids. In this regard, the resistance-imparting agent can fill the fine voids and reduce the degradation of the insulation due to the voids.

As described above, the resistance-imparting agent can attain a high insulation in the insulating layer irrespective of the type of the homo PP or random PP as the propylene-based resin, and also reduce degradation of the insulation of the insulating layer due to the bending and reduce variation in the insulation before and after the bending.

(e) The resin composition preferably includes the random PP and the styrene-based resin, or the random PP, the low-crystallinity resin, and the styrene-based resin. By using at least the random PP and the styrene-based resin, the generation of large voids can be reduced during the formation of the insulating layer, and the generation of new voids can also be reduced when the obtained insulating layer is bent. As a result, a still higher insulation can be obtained in a state before application of the external stress in the insulating layer, and the higher insulation can be maintained even after the bending.

(f) The resin composition preferably includes the random PP as the propylene-based resin and the flexible component that is the low-crystallinity resin or the styrene-based resin at a ratio such that the melting point of the resin composition is 140° C. or more and 150° C. or less, and the enthalpy of fusion is 55 J/g or more and 100 J/g or less. In addition, the resin composition preferably includes the homo PP as the propylene-based resin and the flexible component that is the low-crystallinity resin or the styrene-based resin at a ratio such that the melting point of the resin composition is 158° C. or more and 168° C. or less, and the enthalpy of fusion is 55 J/g or more and 110 J/g or less. When the individual components are included at a ratio such that the enthalpy of fusion and the melting point of the resin composition fall within the above-described range, excessive crystal growth of the propylene-based resin can be reduced in the insulating layer, and a higher insulation can be obtained in the insulating layer.

(g) The resin composition preferably includes, as the resin components, the propylene-based resin, the low-crystallinity resin, and the styrene-based resin. Accordingly, compared to a case where only the low-crystallinity resin or the styrene-based resin is added, crystal growth of the propylene-based resin can be further controlled, and the number or size of the voids can be reduced. In addition, the formation of voids due to the bending of the insulating layer can be further reduced. Moreover, by adding the resistance-imparting agent to the resin composition, the resistance-imparting agent can be filled in the fine voids to improve the insulation. Furthermore, even when the fine voids are formed due to the bending of the insulating layer, degradation of the insulation can be mitigated, and variation in the insulation before and after the bending can be reduced. In addition, the resistance-imparting agent can mitigate the degradation of the insulation due to void formation, which can decrease the addition amount of the styrene-based resin that reduces the void formation.

Other Embodiment of Disclosure

Although embodiments of the present disclosure have been specifically described, the present disclosure is not limited to the embodiments described above, and various modifications can be made without departing from the gist of the present disclosure.

In the above-described embodiments, an explanation is given for the resin composition molded body as the insulating layer obtained by mechanical mixing and extrusion, but the resin composition molded body may be the one obtained by polymerization and extrusion.

In the above-described embodiments, an explanation is given for a case where the power cable 10 may have no water shielding layer, but the present disclosure is not limited to the case. The power cable 10 may have a simple water shielding layer. Specifically, the simple water shielding layer includes, for example, a metallic laminated tape. The metallic laminated tape has, for example, a metal layer containing aluminum, copper, or the like, and an adhesive layer provided on one or both surfaces of the metal layer. The metallic laminated tape is wrapped longitudinally around the outer circumference of a cable core (outer circumference outward of the external semiconductive layer) so as to surround of the cable core. The water shielding layer may be provided outside the shielding layer, or may also serve as the shielding layer. This configuration can reduce the cost of the power cable 10.

In the above-described embodiments, an explanation is given for a case where the power cable 10 is configured to be laid on the ground, under water, or on the bottom of water, but the present disclosure is not limited to the case. For example, the power cable 10 may be configured as a so-called overhead wire (overhead insulated wire).

In the above-described embodiments, three layers are extruded simultaneously in the cable core formation step S300, but they may be individually extruded.

EXAMPLES

Next, examples according to the present disclosure will be described. These examples are illustrative of the present disclosure, and the present disclosure is not limited by these examples.

(1) Preparation of Evaluation Samples

In this example, evaluation samples which mimic the insulating layer of the power cable were prepared according to the following procedures.

(1-1) Materials

As materials of the resin composition for forming evaluation samples, the following components were prepared.

As the propylene-based resin (A), the followings were used:

Isotactic propylene homopolymer (homo PP): melt flow rate: 0.5 g/10 min, density: 0.9 g/ml, melting point: 165° C., enthalpy of fusion: 115 J/g Random polypropylene (random PP): melt flow rate:1.3 g/10 min, density: 0.9 g/ml, melting point: 145° C., enthalpy of fusion: 100 J/g As the low-crystallinity resin (B), the following was used:

Ethylene-propylene rubber (EPR): ethylene content: 52 mass %, Mooney viscosity ML (1+4) 100° C.: 40, melting point: absent, enthalpy of fusion: absent.

As the styrene-based resin (C), the following was used:

Hydrogenated styrene-based thermoplastic elastomer (SEBS): styrene content: 12 mass %, hardness: A42, melt flow rate: 4.5 g/10 min (230° C., 2.16 kg), melting point: absent, enthalpy of fusion: absent.

As components (D), and control components (D') that are in comparative forms of the resistance-imparting agents (D), the followings were used.

TABLE 1

| | | Type | Molecular weight | Phenol number | Surrounding of hydroxyl group | Melting point |
|---|---|---|---|---|---|---|
| Resistance-imparting agent (D) | (d1) | 2-(2H-Benzotriazol-2-yl)-4-(1,1,3,3-tetramethylbutyl)phenol | 323 | 1 | — | 102° C. |
| | (d2) | 2-Hydroxy-4-n-octyloxybenzophenone | 326 | 1 | — | 45° C. |
| | (d3) | 2,4-Dihydroxybenzophenone | 214 | 2 | — | 142° C. |
| | (d4) | 2,2'-Dihydroxy-4,4'-dimethoxybenzophenone | 274 | 2 | — | 135° C. |
| | (d5) | 2,4-Bis(octylthiomethyl)-6-methylphenol | 425 | 1 | — | 14° C. |
| | (d6) | Nonylphenol | 220 | 1 | — | bp 293° C. |
| | (d7) | Dinonylphenol | 346 | 1 | — | −20° C. |
| Comparative component (D') | (d'1) | 2-(4,6-Dimethyl-1,3,5-triazin-2-yl)-5-[2-(2-ethylhexanoyloxy)ethoxy]phenol | 512 | 1 | — | 106° C. |
| | (d'2) | 2-[4,6-Di(2,4-xylyl)-1,3,5-triazin-2-yl]-5-octyloxyphenol | 509 | 1 | — | 90° C. |
| | (d'3) | Glycerin monostearate | 358 | — | — | 63° C. |
| | (d'4) | Dibenzyl ether | 198 | — | — | 4° C. |
| | (d'5) | Octly-3,5-di-tert-4-hydroxy-hydrocinnamic acid | 390 | 1 | Hindered | 10° C. |
| | (d'6) | Benzyl alcohol | 108 | — | — | −15° C. |
| | (d'7) | 1,3,5-Tris(3,5-di-tert-butyl-4-hydroxybenzyl)-1,3,5-triazin-2,4,6(1H,3H,5H)-trione | 784 | 3 | Hindered | 220° C. |
| | (d'8) | 4,4',4''-(1-Methylpropanyl-3-ylidene)tris(6-tert-butyl-m-cresol) | 545 | 3 | One-hindered | 185° C. |
| | (d'9) | Acetophenone | 120 | — | — | bp 202° C. |
| | (d'10) | Decanophenone | 232 | — | — | 35° C. |

In Table 1, the column with the header "Phenol number" indicates the number of phenol skeletons in the compound, where "-" represents 0. The column with the header "Surrounding of hydroxyl group" indicates the presence or absence of steric hindrance around the hydroxyl group, where "-" represents small steric hindrance, "One-hindered" represents a bulky substituent existing at one of the ortho positions to the hydroxyl group, and "Hindered" represents bulky substituents existing at both ortho positions. For the resistance-imparting agent (d6) and the resistance-imparting agent (d'9) that are liquid at an ordinary temperature (27° C.), their boiling points (bp) are listed.

(1-2) Preparation of Resin Composition

The above-described materials were heat-mixed at the ratio shown in the following Tables 2 to 7 to prepare the resin composition.

TABLE 2

| | | Molecular weight | Phenol number | Surrounding of hydroxyl group | Melting point | Sample 1 | 2 | 3 | 4 | 5 | 6 |
|---|---|---|---|---|---|---|---|---|---|---|---|
| Propylene-based resin (A) | Homo PP | | | — | | 75 | 75 | 75 | 75 | 75 | 75 |
| | Random PP | | | — | | — | — | — | — | — | — |
| Low-crystallinity resin (B) | EPR | | | — | | 25 | 25 | 25 | 25 | 25 | 25 |
| Styrene-based resin (C) | SEBS | | | — | | — | — | — | — | — | — |
| Resistance-imparting agent (D) | (d1) | 323 | 1 | — | 102° C. | 6 | — | 0.3 | 0.5 | 9 | 12 |
| | (d2) | 326 | 1 | — | 45° C. | — | — | — | — | — | — |
| | (d3) | 214 | 2 | — | 142° C. | — | — | — | — | — | — |
| | (d4) | 274 | 2 | — | 135° C. | — | — | — | — | — | — |
| | (d5) | 425 | 1 | — | 14° C. | — | — | — | — | — | — |
| | (d6) | 220 | 1 | — | bp 293° C. | — | — | — | — | — | — |
| | (d7) | 346 | 1 | — | −20° C. | — | — | — | — | — | — |
| Insulating layer | Enthalpy of fusion [J/g] | | | | | 87 | 91 | 90 | 89 | 83 | 81 |
| | Melting point [° C.] | | | | | 160 | 162 | 162 | 162 | 159 | 159 |
| Evaluation | AC breakdown electric field strength before bending test [kV/mm] | | | | | 63 | 52 | 57 | 64 | 70 | |
| | Voids formation due to 180° bending | | | | | A | A | A | A | A | |
| | AC breakdown electric field strength after bending test [kV/mm] | | | | | 65 | 21 | 20 | 49 | 71 | |
| | Ratio of variation in AC breakdown electric field strength [%] | | | | | 3.2 | 59.6 | 84.9 | 23.4 | 1.4 | |

TABLE 3

| | | Molecular weight | Phenol number | Surrounding of hydroxyl group | Melting point | Sample 7 | 8 | 9 | 10 |
|---|---|---|---|---|---|---|---|---|---|
| Propylene-based resin (A) | Homo PP | | | — | | 75 | 75 | 75 | 75 |
| | Random PP | | | — | | — | — | — | — |
| Low-crystallinity resin (B) | EPR | | | — | | 25 | 25 | 25 | 25 |
| Styrene-based resin (C) | SEBS | | | — | | — | — | — | — |

TABLE 3-continued

| | | Molecular weight | Phenol number | Surrounding of hydroxyl group | Melting point | Sample 7 | 8 | 9 | 10 |
|---|---|---|---|---|---|---|---|---|---|
| Resistance-imparting agent (D) | (d1) | 323 | 1 | — | 102° C. | — | — | — | — |
| | (d2) | 326 | 1 | — | 45° C. | 5 | — | — | — |
| | (d3) | 214 | 2 | — | 142° C. | — | 5 | — | — |
| | (d4) | 274 | 2 | — | 135° C. | — | — | 3 | — |
| | (d5) | 425 | 1 | — | 14° C. | — | — | — | 5 |
| | (d6) | 220 | 1 | — | bp 293° C. | — | — | — | — |
| | (d7) | 346 | 1 | — | −20° C. | — | — | — | — |
| Insulating layer | Enthalpy of fusion [J/g] | | | | | 88 | 88 | 90 | 89 |
| | Melting point [° C.] | | | | | 161 | 161 | 162 | 162 |
| Evaluation | AC breakdown electric field strength before bending test [kV/mm] | | | | | 67 | 66 | 61 | 69 |
| | Voids formation due to 180° bending | | | | | A | A | A | A |
| | AC breakdown electric field strength after bending test [kV/mm] | | | | | 61 | 63 | 55 | 67 |
| | Ratio of variation in AC breakdown electric field strength [%] | | | | | 9.0 | 4.5 | 9.8 | 2.9 |

TABLE 4

| | | Molecular weight | Phenol number | Surrounding of hydroxyl group | Melting point | Sample 11 | 12 | 13 | 14 |
|---|---|---|---|---|---|---|---|---|---|
| Propylene-based resin (A) | Homo PP | | | — | | 75 | 75 | 75 | 75 |
| | Random PP | | | — | | — | — | — | — |
| Low-crystallinity resin (B) | EPR | | | — | | 25 | 25 | 25 | 25 |
| Styrene-based resin (C) | SEBS | | | — | | — | — | — | — |
| Resistance-imparting agent (D) | (d1) | 323 | 1 | — | 102° C. | — | — | — | — |
| | (d2) | 326 | 1 | — | 45° C. | — | — | — | — |
| | (d3) | 214 | 2 | — | 142° C. | — | — | — | — |
| | (d4) | 274 | 2 | — | 135° C. | — | — | — | — |
| | (d5) | 425 | 1 | — | 14° C. | 0.5 | 0.3 | — | — |
| | (d6) | 220 | 1 | — | bp 293° C. | — | — | 5 | — |
| | (d7) | 346 | 1 | — | −20° C. | — | — | — | 6 |
| Insulating layer | Enthalpy of fusion [J/g] | | | | | 90 | 91 | 89 | 86 |
| | Melting point [° C.] | | | | | 162 | 162 | 161 | 161 |
| Evaluation | AC breakdown electric field strength before bending test [kV/mm] | | | | | 62 | 52 | 63 | 66 |
| | Voids formation due to 180° bending | | | | | A | A | A | A |
| | AC breakdown electric field strength after bending test [kV/mm] | | | | | 48 | 18 | 59 | 62 |
| | Ratio of variation in AC breakdown electric field strength [%] | | | | | 22.6 | 85.4 | 6.3 | 6.1 |

TABLE 5

| | | Molecular weight | Phenol number | Surrounding of hydroxyl group | Melting point | Sample 15 | 16 | 17 | 18 | 19 | 20 |
|---|---|---|---|---|---|---|---|---|---|---|---|
| Propylene-based resin (A) | Homo PP | | | — | | — | — | — | — | — | — |
| | Random PP | | | — | | 65 | 65 | 65 | 70 | 70 | 70 |
| Low-crystallinity resin (B) | EPR | | | — | | 35 | 35 | 35 | 10 | 10 | 10 |
| Styrene-based resin (C) | SEBS | | | — | | — | — | — | 20 | 20 | 20 |
| Resistance-imparting agent (D) | (d1) | 323 | 1 | — | 102° C. | 5 | 0.5 | — | — | — | — |
| | (d2) | 326 | 1 | — | 45° C. | — | — | — | — | — | — |
| | (d3) | 214 | 2 | — | 142° C. | — | — | — | — | — | — |
| | (d4) | 274 | 2 | — | 135° C. | — | — | — | — | — | — |
| | (d5) | 425 | 1 | — | 14° C. | | | | 5 | 0.5 | |
| | (d6) | 220 | 1 | — | bp 293° C. | — | — | — | — | — | — |
| | (d7) | 346 | 1 | — | −20° C. | — | — | — | — | — | — |
| Insulating layer | Enthalpy of fusion [J/g] | | | | | 61 | 67 | 68 | 69 | 73 | 75 |
| | Melting point [° C.] | | | | | 142 | 143 | 143 | 142 | 144 | 144 |
| Evaluation | AC breakdown strength before bending test [kV/mm] | | | | | 89 | 82 | 67 | 86 | 77 | 66 |
| | Voids formation due to 180° bending | | | | | B | B | B | B | B | B |
| | AC breakdown strength after bending test [kV/mm] | | | | | 89 | 81 | 66 | 88 | 78 | 68 |
| | Ratio of variation in AC breakdown electric field strength [%] | | | | | 0.0 | 1.2 | 1.5 | 2.3 | 1.3 | 3.0 |

TABLE 6

| | | Molecular weight | Phenol number | Surrounding of hydroxyl group | Melting point | Sample 21 | 22 | 23 | 24 | 25 |
|---|---|---|---|---|---|---|---|---|---|---|
| Propylene-based resin (A) | Homo PP | | | — | | 75 | 75 | 75 | 75 | 75 |
| | Random PP | | | — | | — | — | — | — | — |
| Low-crystallinity resin (B) | EPR | | | — | | 25 | 25 | 25 | 25 | 25 |
| Styrene-based resin (C) | SEBS | | | — | | — | — | — | — | — |
| Resistance-imparting agent (D') | (d'1) | 512 | 1 | — | 106° C. | 8 | — | — | — | — |
| | (d'2) | 509 | 1 | — | 90° C. | — | 5 | — | — | — |
| | (d'3) | 358 | — | — | 63° C. | — | — | 5 | — | — |
| | (d'4) | 198 | — | — | 4° C. | — | — | — | 6 | — |
| | (d'5) | 390 | 1 | Hindered | 10° C. | — | — | — | — | 6 |
| | (d'6) | 108 | — | — | −15° C. | — | — | — | — | — |
| | (d'7) | 784 | 3 | Hindered | 220° C. | — | — | — | — | — |
| | (d'8) | 545 | 3 | One-hindered | 185° C. | — | — | — | — | — |
| | (d'9) | 120 | — | — | bp 202° C. | — | — | — | — | — |
| | (d'10) | 232 | — | — | 35° C. | — | — | — | — | — |
| Insulating layer | Enthalpy of fusion [J/g] | | | | | 88 | 89 | 90 | 89 | 88 |
| | Melting point [° C.] | | | | | 159 | 161 | 162 | 162 | 162 |
| Evaluation | AC breakdown strength before bending test [kV/mm] | | | | | 51 | 53 | 50 | 50 | 49 |
| | Voids formation due to 180° bending | | | | | A | A | A | A | A |
| | AC breakdown strength after bending test [kV/mm] | | | | | 15 | 16 | 17 | 15 | 14 |
| | Ratio of variation in AC breakdown electric field strength [%] | | | | | 70.6 | 69.8 | 66.0 | 70.0 | 71.4 |

TABLE 7

| | | Molecular weight | Phenol number | Surrounding of hydroxyl group | Melting point | Sample 26 | 27 | 28 | 29 | 30 |
|---|---|---|---|---|---|---|---|---|---|---|
| Propylene-based resin (A) | Homo PP | | | — | | 75 | 75 | 75 | 75 | 75 |
| | Random PP | | | — | | — | — | — | — | — |
| Low-crystallinity resin (B) | EPR | | | — | | 25 | 25 | 25 | 25 | 25 |
| Styrene-based resin (C) | SEBS | | | — | | — | — | — | — | — |
| Resistance-imparting agent (D') | (d'1) | 512 | 1 | — | 106° C. | — | — | — | — | — |
| | (d'2) | 509 | 1 | — | 90° C. | — | — | — | — | — |
| | (d'3) | 358 | — | — | 63° C. | — | — | — | — | — |
| | (d'4) | 198 | — | — | 4° C. | — | — | — | — | — |
| | (d'5) | 390 | 1 | Hindered | 10° C. | — | — | — | — | — |
| | (d'6) | 108 | — | — | −15° C. | 6 | — | — | — | — |
| | (d'7) | 784 | 3 | Hindered | 220° C. | — | 5 | — | — | — |
| | (d'8) | 545 | 3 | One-hindered | 185° C. | — | — | 6 | — | — |
| | (d'9) | 120 | — | — | bp 202° C. | — | — | — | 9 | — |
| | (d'10) | 232 | — | — | 35° C. | — | — | — | — | 4 |
| Insulating layer | Enthalpy of fusion [J/g] | | | | | 90 | 90 | 90 | 84 | 91 |
| | Melting point [° C.] | | | | | 162 | 161 | 161 | 159 | 162 |
| Evaluation | AC breakdown strength before bending test [kV/mm] | | | | | 48 | 46 | 45 | 53 | 55 |
| | Voids formation due to 180° bending | | | | | A | A | A | A | A |
| | AC breakdown strength after bending test [kV/mm] | | | | | 15 | 13 | 12 | 14 | 13 |
| | Ratio of variation in AC breakdown electric field strength [%] | | | | | 68.8 | 71.7 | 73.3 | 73.6 | 78.4 |

(Samples 1 to 6)

For sample 1, as shown in Table 2, 75 parts by mass of an isotactic propylene homopolymer (homo PP) as the polypropylene-based resin (A), 25 parts by mass of an ethylene-propylene rubber (EPR) as the low-crystallinity resin (B), and 6 parts by mass of a component (d1) shown in Table 1 as the resistance-imparting agent (D) were mixed, and heat-mixed at 220° C. using a kneader to prepare a resin composition. For sample 2, the resin composition was prepared in the same manner as sample 1, except that the resistance-imparting agent (D) was not added. For samples 3 to 6, the resin composition was prepared in the same manner as sample 1, except that the addition amount of the component (d1) was changed to 0.3 parts by mass, 0.5 parts by mass, 9 parts by mass, or 12 parts by mass, respectively.

(Samples 7 to 14)

For samples 7 to 14, the resin compositions were prepared in the same manner as sample 1, except that the type of the resistance-imparting agent (D) was changed to (d2) to (d7), and the addition amount of the resistance-imparting agent was changed accordingly, as shown in Tables 3 and 4.

(Sample 15 to 17)

For samples 15 and 16, the resin composition was prepared in the same manner as sample 1, except that the type of the propylene-based resin (A) was changed from homo PP to random polypropylene (random PP) and the addition amount of the individual component was changed, as shown in Table 5. For sample 17, the resin composition was prepared in the same manner as samples 15 and 16, except that the resistance-imparting agent (D) was not added.

(Sample 18 to 20)

For samples 18 and 19, the resin composition was prepared in the same manner as sample 15, except that the styrene-based resin (C) was further added as the resin component and the addition amount of the individual component was changed accordingly, as shown in Table 5. For sample 20, the resin composition was prepared in the same manner as samples 18 and 19, except that the resistance-imparting agent (D) was not added.

(Samples 21 to 30)

For samples 21 to 30, the resin composition was prepared in the same manner as sample 1, except that components (d'1) to (d'10) were used as comparative components (D') in place of the resistance-imparting agents (D) and their addition amounts were changed accordingly, as shown in Tables 6 and 7.

(1-3) Preparation of Evaluation Samples

Next, each of the prepared samples 1 to 30 of the resin composition was press-molded at 220° C., and gradually cooled by water cooling under pressure, to prepare a sheet-like evaluation sample with a thickness of 0.4 mm.

(2) Evaluation

The prepared evaluation samples were evaluated for the following items.

(Melting Point and Enthalpy of Fusion)

The prepared evaluation samples were measured for the melting point and the enthalpy of fusion of the resin composition.

The melting point of each evaluation sample was determined by DSC measurement.

The DSC measurement was performed according to JIS-K-7121 (1987). Specifically, DSC 8500 (a power compensation type) manufactured by PerkinElmer Inc. was used as a DSC apparatus. The reference sample was, for example, α-alumina. The mass of the evaluation sample was 8 to g. In the DSC apparatus, the temperature was raised from room temperature (27° C.) to 220° C. at a rate of 10° C./min. Accordingly, a DSC curve was obtained by plotting endothermic amount per unit time (heat flow) against temperature.

In this case, the temperature at which an endothermic amount per unit time in the evaluation sample is maximum (highest peak) is defined as "melting point". In addition, for the DSC curve, the area of the region enclosed between the melting peak and the base line was determined to obtain "enthalpy of fusion".

(AC Breakdown Electric Field Strength)

The AC breakdown electric field strength was measured for the insulation of the prepared evaluation sample. The AC breakdown electric field strength was determined by AC breakdown test. Specifically, at an ordinary temperature (27° C.), the evaluation sample was subjected to a commercial frequency (e.g., 60 Hz) AC voltage under conditions of applying a voltage of 10 kV for minutes, then repeating cycle of raising the voltage by 1 kV increment and applying the raised voltage for 10 minutes. An electric field strength at which a breakdown occurred in the evaluation sample was measured. In this example, for the evaluation sample, the AC breakdown electric field strength was measured before and after a bending test described below. In this example, for the evaluation samples after the bending test, when voids larger than 10 μm were observed, those with the electric field strength of 45 kV/mm or more were evaluated as good, and when voids larger than 10 μm were not observed, those with the electric field strength of 70 kV/mm or more were evaluated as good.

(Bending Test)

In order to confirm the generation of voids in the evaluation sample, the evaluation sample was subjected to a 180° bending test. Specifically, the evaluation sample was bent at 180° with a diameter of 500 mm, the bent part was cut, and surface of the part was observed by SEM. In Tables 2 to 4, A indicates that voids larger than 10 μm were observed, and B indicates that no voids were observed.

(3) Evaluation Results

The results of the above-described evaluations for the evaluation samples are shown in Tables 2 to 7.

Regarding samples 1 to 6, samples 1, 4, and 5 in which the addition amount of the resistance-imparting agent (D) was 0.4 parts by mass to 10 parts by mass were observed to have higher AC breakdown electric field strength before bending and excellent insulation, compared to sample 2 with no resistance-imparting agent (D) added thereto and sample 3 in which the addition amount of the resistance-imparting agent (D) was 0.3 parts by mass. In addition, as a result of the bending test performed on each of samples, voids with a size exceeding 10 μm were observed to be formed in all of samples. In samples 2 and 3, the AC breakdown electric field strength before the bending was low, and the AC breakdown electric field strength decreased significantly after the bending test. In contrast, in samples 1, 4, and 5, the AC breakdown electric field strength was high before the bending test, and variation in the AC breakdown electric field strength was small in spite of voids being formed due to the bending. Accordingly, it is found that degradation of the insulation due to the bending is mitigated. It is probably because, in samples 1, 4, and 5, the resistance-imparting agent (D) can be sufficiently filled in the voids present in the sample. In sample 6, since the addition amount of the resistance-imparting agent (D) is excessive, as much as 12 parts by mass, the evaluation sample cannot be formed into a sheet.

In samples 1, 7 to 10, 13, and 14, the type of the resistance-imparting agent (D) was changed accordingly, but all of them were observed to have a high insulation at the initial state, and, in spite of the voids being formed due to the bending, to mitigate degradation of the insulation due to the voids, thereby to maintain the high insulation. Sample 10 was observed to have higher AC breakdown electric field strength in the initial state and less variation in the AC breakdown electric field strength due to the bending, compared to other samples. Accordingly, as the resistance-imparting agent (D), the one including a sulfur atom and a linear carbon structure having or more and 10 or less carbon atoms in its chemical structure was found to be preferable.

Further, samples 10 to 12 were observed to obtain a high insulation and mitigate degradation of the insulation due to the bending by appropriately setting the addition amount of the resistance-imparting agent (D), similar to samples 1 to 6.

Samples 15 and 16 were observed to increase the AC breakdown electric field strength before the bending test compared to sample 1 that uses the homo PP, by using the random PP as the propylene-based resin. Further, the use of the random PP was observed to prevent the formation of large voids exceeding 10 μm in size from being formed when the sample was bent. Moreover, it was observed to enable variation in the AC breakdown electric field strength due to the bending to be reduced. In addition, sample 17 with no resistance-imparting agent (D) added thereto was observed to have smaller AC breakdown electric field strength in the initial state compared to samples 15 and 16 with the resistance-imparting agent (D) added thereto. It is probably because fine voids are present in the sample 17, whereas fine voids present in samples 15 and 16 are filled with the resistance-imparting agent (D), which enables degradation of the insulation to be reduced.

Samples 18 and 19 were observed to increase the AC breakdown electric field strength in the initial state compared to sample 1, by adding the styrene-based resin together with the low-crystallinity resin to the propylene-based resin. Even when the sample was bent, large voids exceeding 10 μm in size were not found to be formed, and the AC breakdown electric field strength was not found to significantly vary before and after the bending. Sample 20 with no resistance-imparting agent (D) added thereto was found to have smaller AC breakdown electric field strength in the initial state compared to samples 18 and 19 with the resistance-imparting agent (D) added thereto. It is probably because sample 20 has fine voids present therein, whereas fine voids present in samples 18 and 19 are filled with the resistance-imparting agent (D), which enables degradation of the insulation to be reduced.

For samples 21 to 30, the insulation before the bending was observed to be low and the insulation was observed to be significantly degraded after the bending, because of the use of comparative component (D') that has the molecular weight out of the range from 200 to 500, no phenol skeleton, steric hindrance occurring around the hydroxyl group, or melting point higher than that of the resin component, as shown in Table 4. It is probably because the comparative component (D') fails to sufficiently fill voids, or the comparative component (D') fails to sufficiently mitigate the sharp change in resistance between the comparative component (D') and the insulating layer even if it can fill the voids. The reason why the comparative component (D') fails to sufficiently fill the voids is supposed that: the comparative component (D') vaporizes during heat-mixing because of its excessively small molecular weight, the comparative component (D') fails to be dispersed in the resin composition during heat-mixing because of its excessively large molecular weight, or the comparative component (D') fails to sufficiently melt during heat-mixing because of its melting point being higher than that of the resin component. The reason why the comparative component (D') fails to mitigate the sharp change in resistance between the comparative component (D') and the insulating layer is supposed that: the comparative component (D') has no phenol skeleton that contributes electrical stability, or the hydroxyl group has low reactivity because of steric hindrance.

As described above, it is confirmed that the addition of a predetermined amount of the resistance-imparting agent having a predetermined chemical structure, molecular weight, and melting point to the resin component including the propylene units can improve the insulation in the initial state in the insulating layer, and also can reduce degradation of the insulation after the bending.

Preferred Aspect of Disclosure

Hereinafter, supplementary descriptions of the preferred aspects of the present disclosure will be given.

(Supplementary Description 1)

A resin composition, including:
- a resin component containing propylene units, and
- a resistance-imparting agent,
- wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 145° C. or less and a molecular weight of 200 or more and 500 or less, and
- a content of the resistance-imparting agent is 0.4 parts by mass or more and 10 parts by mass or less with respect to 100 parts by mass of the resin component.

(Supplementary Description 2)

A power cable, including:
- a conductor, and
- an insulating layer coated on an outer circumference of the conductor,
- wherein the insulating layer is formed from a resin composition,
- the resin composition includes a resin component containing propylene units, and a resistance-imparting agent,
- the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 145° C. or less and a molecular weight of 200 or more and 500 or less, and
- a content of the resistance-imparting agent is 0.4 parts by mass or more and 10 parts by mass or less with respect to 100 parts by mass of the resin component.

(Supplementary Description 3)

The power cable according to supplementary description 2,
- wherein the resin component further contains at least one of ethylene units and styrene units.

(Supplementary Description 4)

The power cable according to supplementary description 2 or 3,
- wherein the resistance-imparting agent has a melting point such that it becomes liquid at 27° C.

(Supplementary Description 5)

The power cable according to any one of supplementary descriptions 2 to 4,
- wherein the resistance-imparting agent has a linear carbon structure having 5 or more and 10 or less carbon atoms.

(Supplementary Description 6)

The power cable according to any one of supplementary descriptions 2 to 5,
- wherein the resistance-imparting agent contains a sulfur atom.

(Supplementary Description 7)

The power cable according to any one of supplementary descriptions 2 to 6,
- wherein the resistance-imparting agent is a phenolic antioxidant.

(Supplementary Description 8)

The power cable according to any one of supplementary descriptions 2 to 7,
- wherein the resin composition includes as the propylene-based resin a propylene homopolymer having a melting point of 160° C. or more and 175° C. or less and an enthalpy of fusion of 100 J/g or more and 120 J/g or less, and
- the resin composition has a melting point of 158° C. or more and 168° C. or less and an enthalpy of fusion of 55 J/g or more and 110 J/g or less.

(Supplementary Description 9)

The power cable according to any one of supplementary descriptions 2 to 7,
- wherein the resin composition includes as the propylene-based resin a propylene random copolymer having a melting point of 140° C. or more and 155° C. or less and an enthalpy of fusion of 90 J/g or more and 105 J/g or less, and
- the resin composition has a melting point of 140° C. or more and 150° C. or less and an enthalpy of fusion of 55 J/g or more and 100 J/g or less.

(Supplementary Description 10)

A method of producing a power cable, including:

preparing a resin composition by mixing a propylene-based resin, a flexible component containing at least one of a low-crystallinity resin and a styrene-based resin, and a resistance-imparting agent; and coating an insulating layer around a conductor using the resin composition, wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 145° C. or less and a molecular weight of 200 or more and 500 or less, and in the preparation of the resin composition, 0.4 parts by mass or more and 10 parts by mass or less of the resistance-imparting agent is added to 100 parts by mass of a resin component containing the propylene-based resin and the flexible component.

(Supplementary Description 11)

The method of producing a power cable according to supplementary description 10, wherein in the preparation of the resin composition, 55 parts by mass or more and 95 parts by mass or less of the propylene-based resin and 5 parts by mass or more and 45 parts by mass or less of the flexible component are mixed, with respect to a total of the propylene-based resin and the flexible component being 100 parts by mass.

(Supplementary Description 12)

The method of producing a power cable according to supplementary description 10 or 11, wherein the propylene-based resin is a propylene homopolymer having a melting point of 160° C. or more and 175° C. or less and an enthalpy of fusion of 100 J/g or more and 120 J/g or less, and in the preparation of the resin composition, the propylene-based resin and the flexible component are mixed so that the resin composition has a melting point of 158° C. or more and 168° C. or less and an enthalpy of fusion of 55 J/g or more and 110 J/g or less.

Supplementary Description 13

The method of producing a power cable according to supplementary description 10 or 11, wherein the propylene-based resin is a propylene random copolymer having a melting point of 140° C. or more and 155° C. or less and an enthalpy of fusion of 90 J/g or more and 105 J/g or less, and in the preparation of the resin composition, the propylene-based resin and the flexible component are mixed so that the resin composition has a melting point of 140° C. or more and 150° C. or less and an enthalpy of fusion of 55 J/g or more and 100 J/g or less.

REFERENCE SIGNS LIST

10 Power cable
110 Conductor
120 Internal semiconductive layer
130 Insulating layer
140 External semiconductive layer
150 Shielding layer
160 Sheath

The invention claimed is:

1. A power cable, comprising:

a conductor, and an insulating layer coated on an outer circumference of the conductor, wherein the insulating layer is formed from a resin composition, the resin composition comprises a resin component containing propylene units, and a resistance-imparting agent, the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 145° C. or less and a molecular weight of 200 or more and 500 or less, and a content of the resistance-imparting agent is 0.4 parts by mass or more and 10 parts by mass or less with respect to 100 parts by mass of the resin component.

2. The power cable according to claim 1, wherein the resin component further contains at least one of ethylene units and styrene units.

3. The power cable according to claim 1, wherein the resistance-imparting agent has a linear carbon structure having 5 or more and 10 or less carbon atoms.

4. The power cable according to claim 1, wherein the resistance-imparting agent contains a sulfur atom.

5. The power cable according to claim 1, wherein the resistance-imparting agent has a melting point such that it becomes liquid at 27° C.

6. The power cable according to claim 1, wherein the resistance-imparting agent is a phenolic antioxidant.

7. The power cable according to claim 1, wherein the resin composition comprises as the propylene-based resin a propylene homopolymer having a melting point of 160° C. or more and 175° C. or less and an enthalpy of fusion of 100 J/g or more and 120 J/g or less, and the resin composition has a melting point of 158° C. or more and 168° C. or less and an enthalpy of fusion of 55 J/g or more and 110 J/g or less.

8. The power cable according to claim 1, wherein the resin composition comprises as the propylene-based resin a propylene random copolymer having a melting point of 140° C. or more and 155° C. or less and an enthalpy of fusion of 90 J/g or more and 105 J/g or less, and the resin composition has a melting point of 140° C. or more and 150° C. or less and an enthalpy of fusion of 55 J/g or more and 100 J/g or less.

* * * * *